United States Patent Office 3,458,373
Patented July 29, 1969

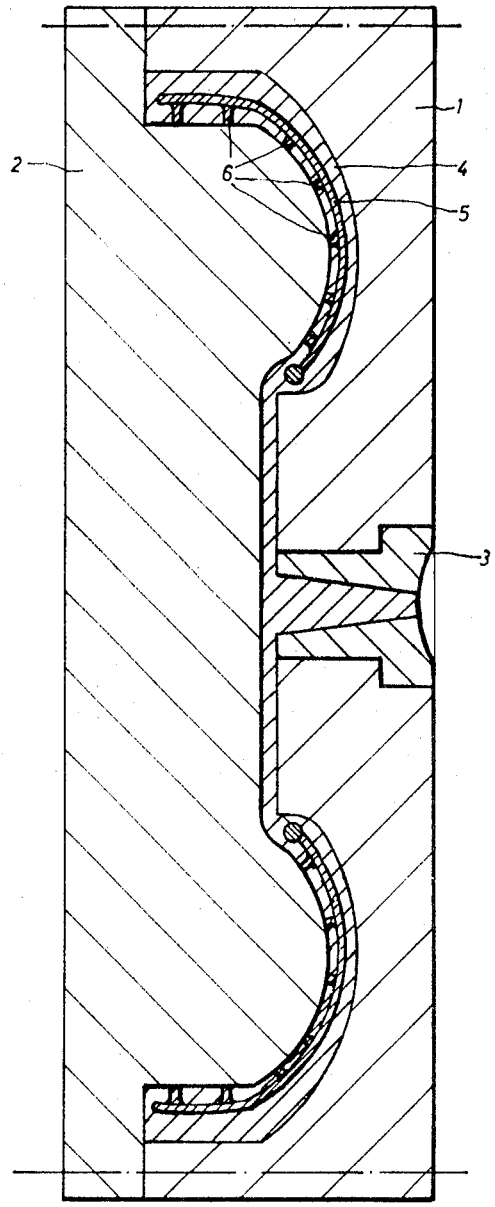
INVENTORS:
ULRICH KNIPP, ERWIN WEINBRENNER.

3,458,373
INJECTION-MOLDED, REINFORCED PNEUMATIC
TIRES AND METHOD OF MAKING SAME
Ulrich Knipp, Leverkusen, and Erwin Weinbrenner, Opladen, Germany, assignors to Farbenfabriken Bayer Aktiengesellschaft, Leverkusen, Germany, a corporation of Germany
Filed Dec. 3, 1965, Ser. No. 511,382
Claims priority, application Germany, Dec. 3, 1964,
F 44,610
Int. Cl. B29h 17/02
U.S. Cl. 156—125    7 Claims

ABSTRACT OF THE DISCLOSURE

Pneumatic tires are prepared by a process comprising placing a reinforcing means into a mold shaped to form one-half of a tire body, injecting an elastomeric polyurethane into the mold to envelop the reinforcing means, removing the molded tire half from the mold and joining it to a second similarly prepared tire half.

---

This invention relates to reinforced pneumatic tires and to a process for the production of reinforced pneumatic tires.

Conventionally, pneumatic tires to be used for vehicles of various types are built up from rubber-fabric or rubber-steel cord combinations which are then vulcanized in suitable molds to form the tire body in a process that is both time consuming and expensive.

Alternatively, therefore, synthetic resin elastomers based on soft polyvinyl chloride or polyurethane or acrylic acid esters have been proposed for the fabrication of tire bodies. The great advantage of such materials is that they can be manipulated into the proper shape by centrifugal casting, thus obviating the expensive molding operations formerly employed. Unfortunately, the centrifugal casting method was found to be equally expensive. In addition, the portion of the mold which formed the core and thus, the hollow of the tire, had to be composed of several steel parts which had to be absolutely tightly sealed during the casting process. However, it was found that such a condition is difficult if not impossible to fulfill consistently on a mass production basis. Furthermore, it has been found that in tires prepared from unfilled elastomers, such elastomers begin to flow after a while under the pressure of the air in the tires with the result that the external dimensions of the tires do not remain constant. In order to improve this last condition, attempts were made to incorporate fabric reinforcements into the body of the tire in the centrifugal casting process. Such attempts failed because no method could be devised to satisfactorily fix the fabric in the casting process.

Therefore, the problem of manufacturing the body of a tire by a simple method which will permit the simultaneous reinforcement of the tire to achieve the same effect as is obtained by means of fabric reinforcement remains.

It is, therefore, an object of this invention to provide reinforced pneumatic tires which are devoid of the foregoing difficulties.

It is a further object of this invention to provide a simple process for the manufacture of tires which will permit the reinforcement of the tire body in the same manner as when fabric reinforcement is used.

Another object of this invention is to provide a process for the production of a tire which will retain constant dimensions under the influence of internal air pressure.

Other objects will become apparent from the following description with reference to the accompanying drawing, which is a cross-sectional view of an injection molded, reinforced tire-half prepared according to the process of this invention. Generally speaking, the objects of this invention are accomplished by a process which comprises inserting a means for reinforcing the tire into a mold shaped to form one-half of a tire body divided along its circumference, and injecting a polyurethane elastomer into the mold to envelop the reinforcing means. Two tire halves prepared in this manner are then joined together along their circumferential surfaces to complete the construction of the tire body.

The reinforcing member can be prepared in any suitable manner but it is invariably a ring, the diameter of which is approximately equal to that of the bead of the tire. The ring is connected to a basket-like structure having cam projections on it which ensure the distance of the structure from the inner walls of the mold. The contour of the basket-like portion of the reinforcing means is adapted to conform to the shape of the tire half to be cast or molded and is generally braided from organic or inorganic "wire" or from thermoplastic synthetic resins by processes such as injection molding, for example. In the first instance, any suitable material may be used for braiding the basket such as, for example, steel wires, polyamide threads, terephthalic acid-polyester threads, and threads based on polyacrylonitrile and linear polyurethanes. In the second instance any suitable materials may be used for the molding of the reinforcing means such as, for example, polyamides, linear polyurethanes, polycarbonates, high molecular weight polyolefins such as polyethylene, polypropylene, polybutylene, mixed polymers thereof and the like and polyoxymethylenes. It is also advantageous to provide the reinforcing means with an adhesive to promote adhesion between the reinforcing means and the elastomer to be molded around it. Any suitable adhesive may be used and all are contemplated.

The polyurethane constituent of the molded tire body may be any suitable polyurethane composition having a hardness of 50–92 Shore A and prepared by reacting an organic compound containing active hydrogen atoms, which are reactive with NCO groups, with an organic polyisocyanate. In many instances, it is also desirable to incorporate into the reaction formulation a chain extending agent which is an organic compound containing active hydrogen atoms reactive with isocyanate groups and having a molecular weight generally less than about 500 where the active hydrogen atoms are selected from hydroxyl groups, amino groups and carboxyl groups. Any suitable organic polyisocyanate and active hydrogen containing compound may be used in the preparation of the polyurethane, and particularly those disclosed in U.S. Patent 3,208,500. Elastomeric polyurethanes which have a fiber filling may also be used.

Any suitable molding method may be used in the preparation of the halves of the tire body, but it is most advantageous to use injection molding for the fabrication of tire halves having small and medium dimensions, whereas the reaction injection process is more expedient for molding the body of halves of tires having comparatively large dimensions. Once prepared, the halves of the tire are joined together by adhesion or welding. For concentric halves of a wheel it is especially recommended to employ friction welding, pressure welding or butt welding, whereas for divided tires with an overlap, it is to be preferred to employ hot wedge welding, heat impulse welding or dielectric welding.

Referring now to the drawing for an illustration of the principle of the invention, the injection mold being used has an outer half 1, an inner half 2 and a sprue bushing 3. The reinforcing means 5 is inserted into the cavity formed by the mold and rests with its projections 6 on the inner part 2 of the mold. The polyurethane resin is injected into the cavity 4 and encloses the reinforcing means 5.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A process for the preparation of pneumatic tires which comprises placing a reinforcing means into a mold, said mold being shaped to form one-half of a tire body divided along its circumference, injecting an elastomeric polyurethane into the mold to envelope the reinforcing means, removing the molded tire half from the mold and joining it to a second similarly prepared tire half to obtain the completed tire body.

2. The process of claim 1 wherein the reinforcing means is a ring having a basket-like structure connected thereto, the diameter of the ring being substantially equal to that of the bead of the tire.

3. The process of claim 1 wherein the reinforcing means is prepared from braided "wires."

4. The process of claim 1 wherein the reinforcing means is prepared by injection molding a thermoplastic synthetic resin.

5. The process of claim 1 wherein the reinforcing means has cam projections to space the reinforcing means from the inner walls of the mold.

6. Injection-molded, reinforced pneumatic tire halves of thermoplastic elastomers comprising reinforcing means having a basket-like structure, said reinforcing means being prepared from thermoplastics by injection molding.

7. Injection-molded, reinforced pneumatic tire halves as claimed in claim 6 wherein said reinforcing means are provided with projections.

References Cited

UNITED STATES PATENTS

| | | | |
|---|---|---|---|
| 2,476,884 | 7/1949 | Maynard | 156—125 |
| 2,497,226 | 2/1950 | McNeill | 156—127 X |
| 2,672,914 | 3/1954 | Weigold et al. | 156—125 |
| 2,686,554 | 8/1954 | Hinman | 156—127 |
| 2,757,701 | 8/1956 | Henson | 152—357 |
| 2,873,790 | 2/1959 | Cadwell et al. | 156—125 |
| 3,208,500 | 9/1965 | Knipp et al. | 152—357 X |
| 2,642,920 | 6/1953 | Simon et al. | 161—96 X |
| 2,739,090 | 3/1956 | Waugh | 161—96 X |
| 3,364,292 | 1/1968 | Lemelson | 264—275 |

HAROLD ANSHER, Primary Examiner

U.S. Cl. X.R.

152—352, 354; 156—245; 161—116, 89, 190; 264—135, 271, 274, 279